United States Patent
Prochiner

(10) Patent No.: US 7,175,207 B2
(45) Date of Patent: Feb. 13, 2007

(54) CONNECTING ELEMENT FOR MECHANICALLY CONNECTING COMPONENTS

(76) Inventor: Frank Prochiner, Holbeinstrasse 13, 72760 Reutlingen (DE)

( * ) Notice: Subject to any disclaimer, the term of this patent is extended or adjusted under 35 U.S.C. 154(b) by 0 days.

(21) Appl. No.: 10/275,604

(22) PCT Filed: Jun. 4, 2001

(86) PCT No.: PCT/DE01/02166

§ 371 (c)(1), (2), (4) Date: May 16, 2003

(87) PCT Pub. No.: WO01/96776

PCT Pub. Date: Dec. 20, 2001

(65) Prior Publication Data

US 2003/0190186 A1 Oct. 9, 2003

(30) Foreign Application Priority Data

Jun. 4, 2000 (DE) .................................. 100 26 769

(51) Int. Cl.
*F16L 39/00* (2006.01)
*H01R 4/60* (2006.01)
*E03C 1/01* (2006.01)
*E04C 2/52* (2006.01)

(52) U.S. Cl. ................................ 285/124.1; 285/124.4; 285/124.5; 439/191; 4/670; 52/220.8

(58) Field of Classification Search .................. 285/3, 285/124.1, 124.2, 124.3, 124.4, 124.5, 325, 285/326; 439/190, 191; 4/696, 670; 52/220.8
See application file for complete search history.

(56) References Cited

U.S. PATENT DOCUMENTS 2,178,931 A * 11/1939 Crites et al. ................. 439/191

(Continued)

FOREIGN PATENT DOCUMENTS

CH 419 873 A 8/1966

(Continued)

*Primary Examiner*—Vishal Patel
(74) *Attorney, Agent, or Firm*—Michael J. Striker

(57) ABSTRACT

The invention relates to a connecting element for efficiently connecting components and subassemblies with the most diverse configurations to wall, ceiling and floor surfaces of buildings or frames. The connecting element has two coupling halves (1a, 1b) that can be interconnected by jointing and can be fixed to components or subassemblies to be connected by fixing means. The coupling halves and the fixing means are proportioned to guarantee that the connected components or subassemblies maintain a predetermined mechanically stable state during the exertion of operational forces. According to the invention, coupling halves of conduits (2a, 2b, 10, 22, 32, 33, 34, 35) are arranged inside the coupling halves for connecting liquid conduits, gas conduits, electrical conduits or signal conduits, whereby during operation, the conduit coupling halves are connected to the end sections of the conduits to be connected and the coupling halves (1a, 1b) have passages, through which the conduits are directed towards the exterior. The coupling halves are configured in the connected operational state as a housing for the conduit coupling halves (2a, 2b, 10, 22, 32, 33, 34, 35), said housing being designed in such a way that the conduit coupling halves (2a, 2b, 10, 22, 32, 33, 34, 35) and the end sections of the conduits to be connected are protected from operational or environmental damage.

4 Claims, 22 Drawing Sheets

U.S. PATENT DOCUMENTS

| | | | | |
|---|---|---|---|---|
| 2,510,125 | A | * | 6/1950 | Meakin ........................ 174/47 |
| 2,634,311 | A | * | 4/1953 | Darling ........................ 439/191 |
| 2,689,611 | A | * | 9/1954 | Martinson .................. 166/85.2 |
| 2,857,576 | A | * | 10/1958 | Ueckert ....................... 439/191 |
| 2,897,763 | A | * | 8/1959 | Wright ........................ 417/360 |
| 3,227,475 | A | * | 1/1966 | Sinkinson .................... 285/9.2 |
| 3,624,585 | A | * | 11/1971 | Kokalas et al. ............. 439/195 |
| 3,673,541 | A | * | 6/1972 | Volinskie .................... 439/195 |
| 3,766,574 | A | * | 10/1973 | Smid, Jr. ........................ 4/670 |
| 3,869,000 | A | * | 3/1975 | English ....................... 166/380 |
| 3,888,518 | A | * | 6/1975 | Delessert ...................... 285/39 |
| 3,977,703 | A | | 8/1976 | Curtis |
| 4,142,255 | A | * | 3/1979 | Togni ............................ 4/664 |
| 4,321,715 | A | * | 3/1982 | Baus ........................... 4/420.2 |
| 4,533,476 | A | * | 8/1985 | Watkins ...................... 210/805 |
| 4,652,064 | A | * | 3/1987 | Cetrone ....................... 439/587 |
| 4,654,900 | A | * | 4/1987 | McGhee ........................ 4/670 |
| 4,886,426 | A | * | 12/1989 | Surinak ....................... 417/360 |
| 4,993,564 | A | | 2/1991 | Blatt |
| 5,284,311 | A | | 2/1994 | Baer |
| 5,405,269 | A | * | 4/1995 | Stupecky .................... 439/191 |
| 5,417,459 | A | * | 5/1995 | Gray et al. ................... 285/26 |
| 5,566,708 | A | * | 10/1996 | Hobbs, Jr. .................. 137/360 |
| 5,637,006 | A | * | 6/1997 | Almeras ..................... 439/191 |
| 5,746,273 | A | * | 5/1998 | Surinak ...................... 166/85.2 |
| 6,017,065 | A | * | 1/2000 | Helles.o slashed.e ........ 285/25 |
| 6,234,193 | B1 | * | 5/2001 | Hobbs et al. ............... 137/360 |

FOREIGN PATENT DOCUMENTS

| | | | |
|---|---|---|---|
| GB | 2 180 903 A | | 4/1987 |
| JP | 6-88362 | * | 3/1994 |
| JP | 6-88364 | * | 3/1994 |
| JP | 9144086 | | 6/1997 |

* cited by examiner

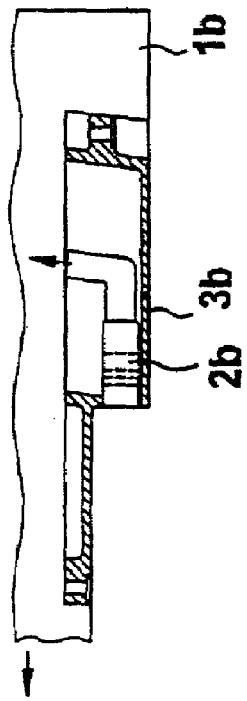
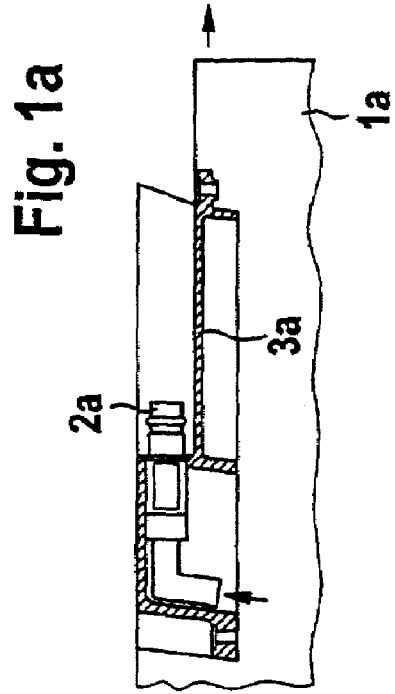
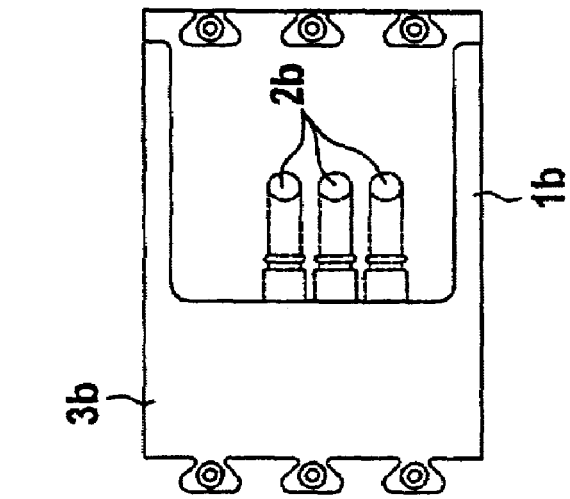
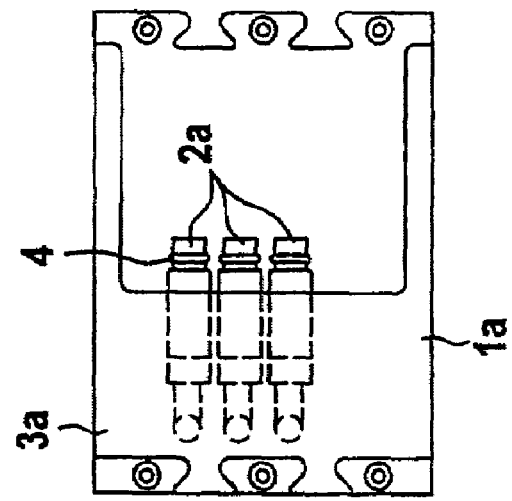
Fig. 1a
Fig. 1b

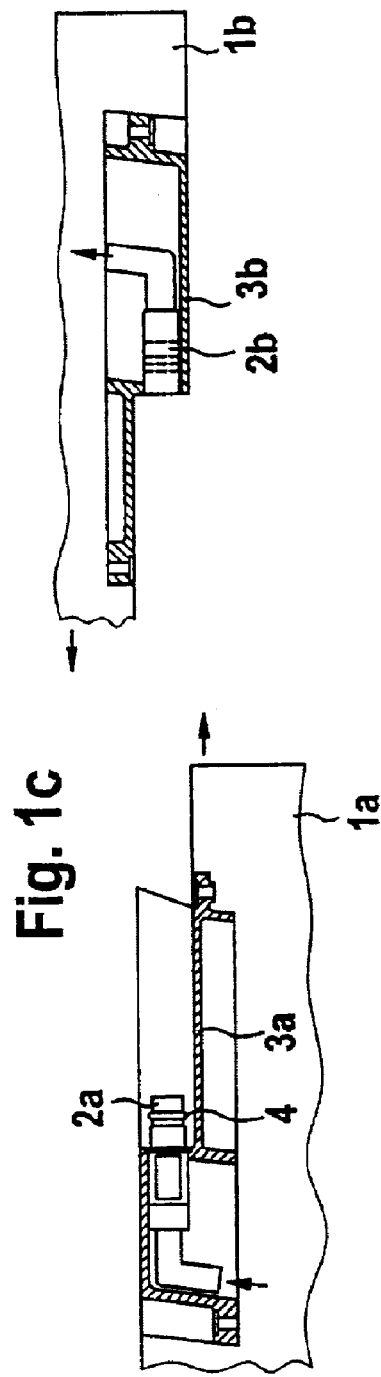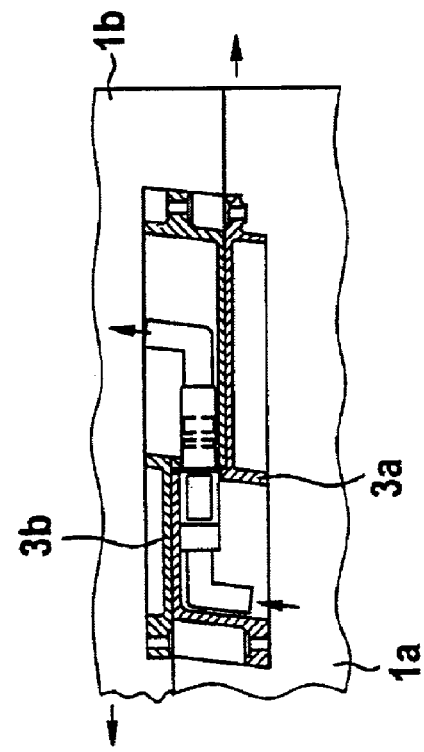

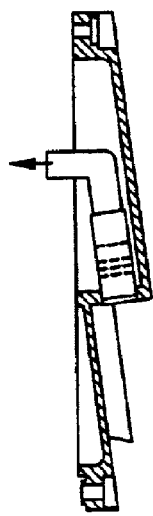
Fig. 2a
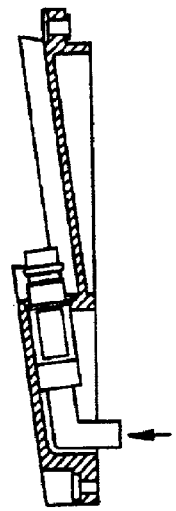
Fig. 2b
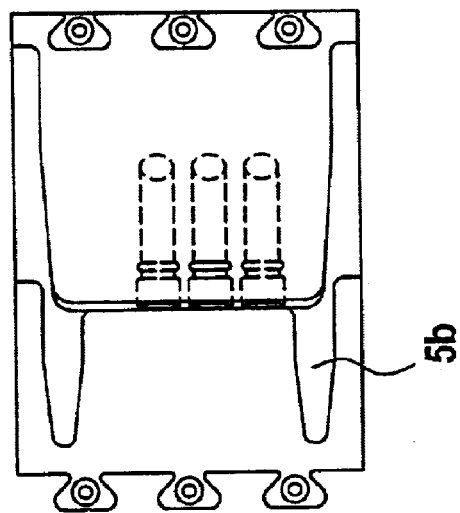
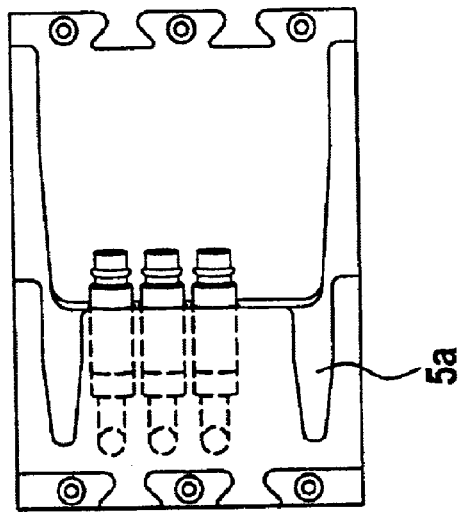

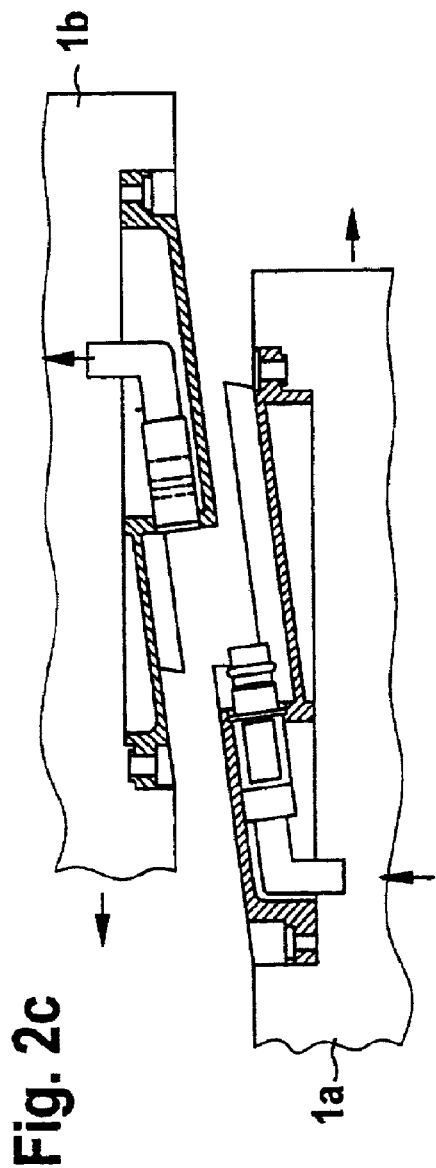
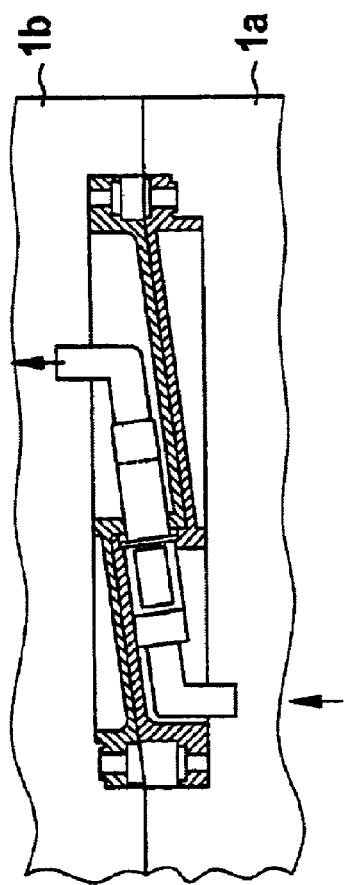
Fig. 2c
Fig. 2d

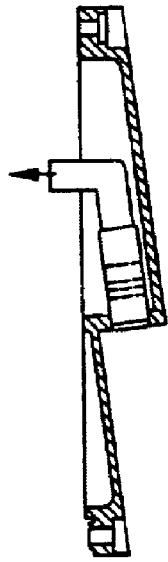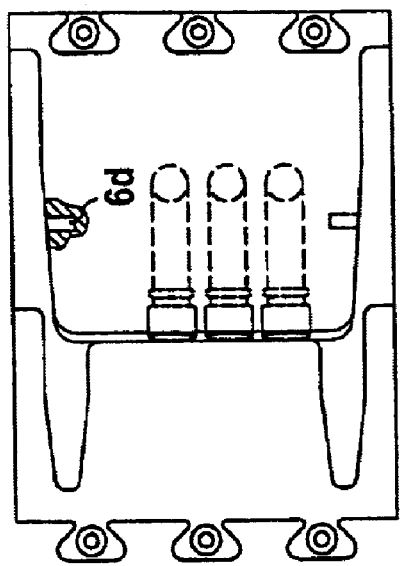
Fig. 3a
Fig. 3b
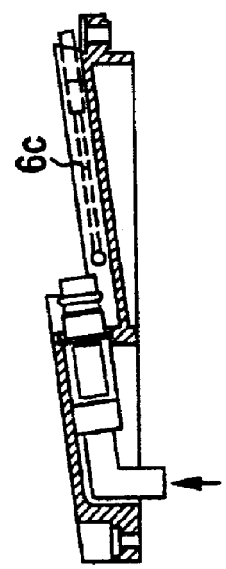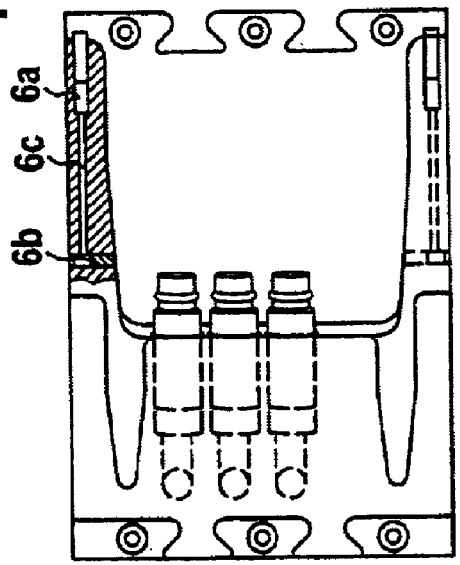

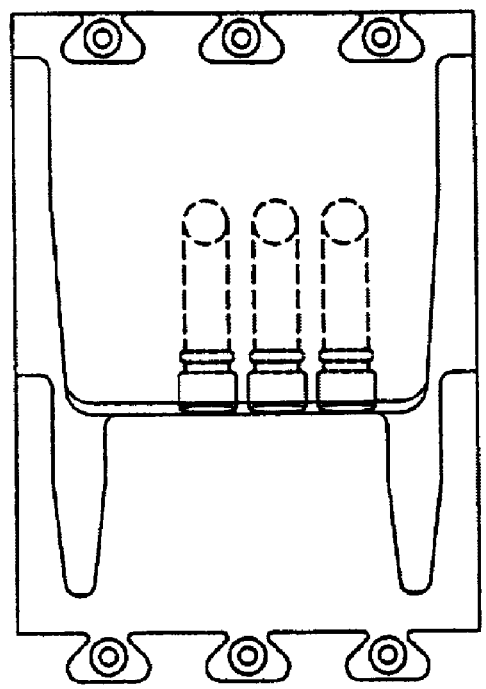
Fig. 4a
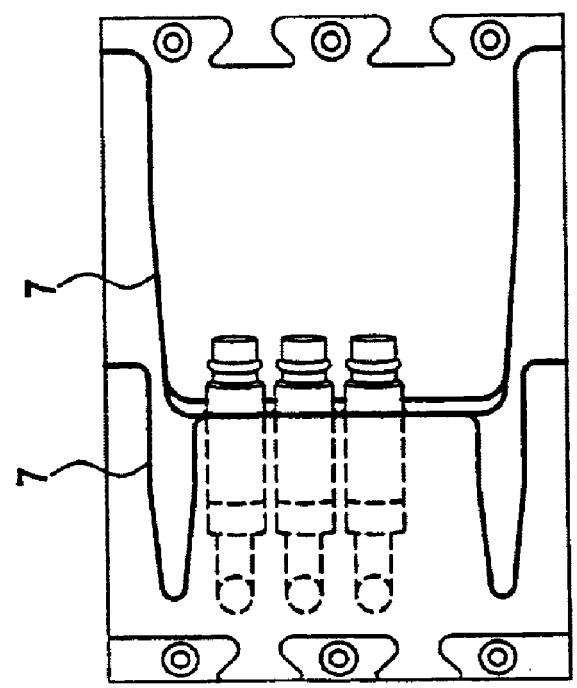

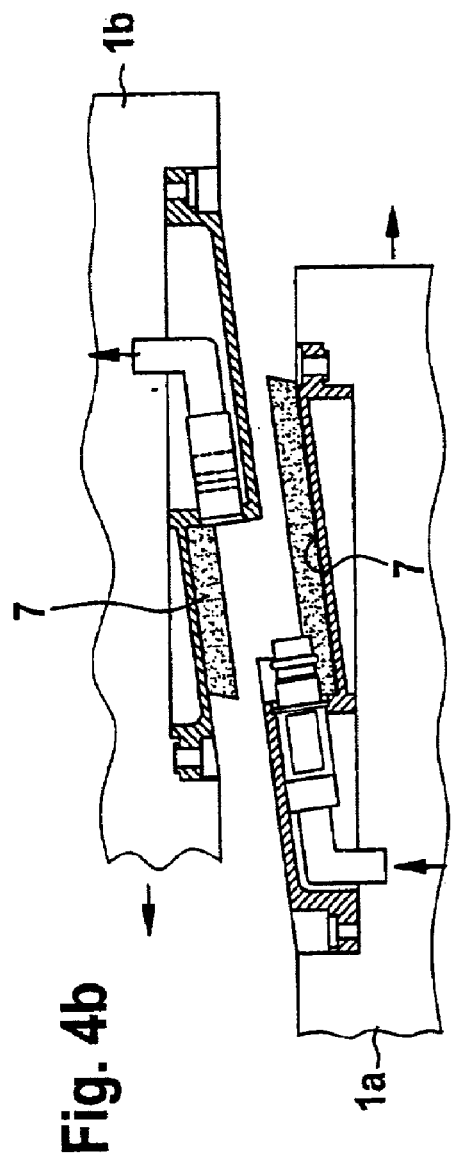
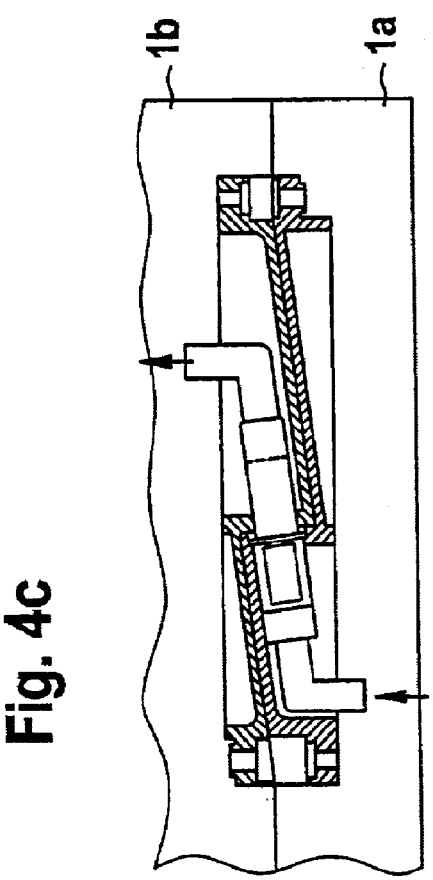
Fig. 4b
Fig. 4c

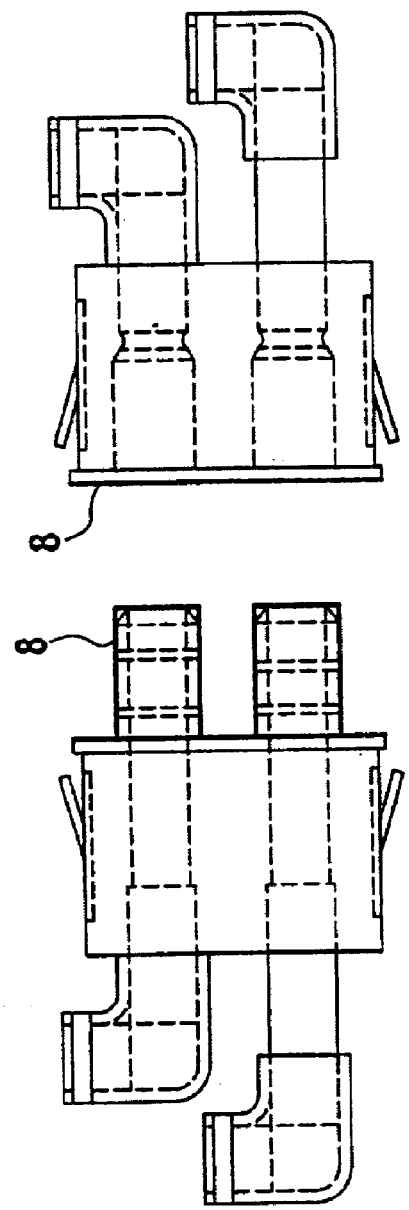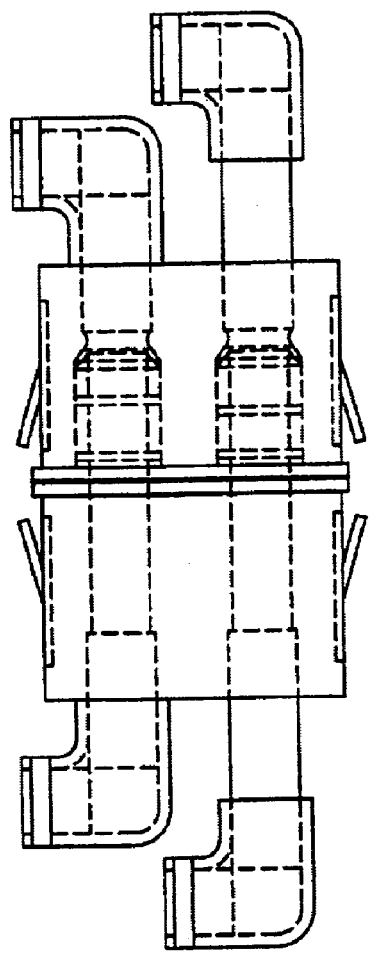
Fig. 5a
Fig. 5b

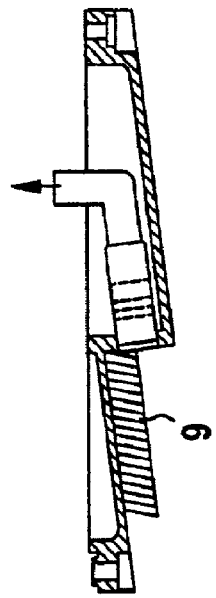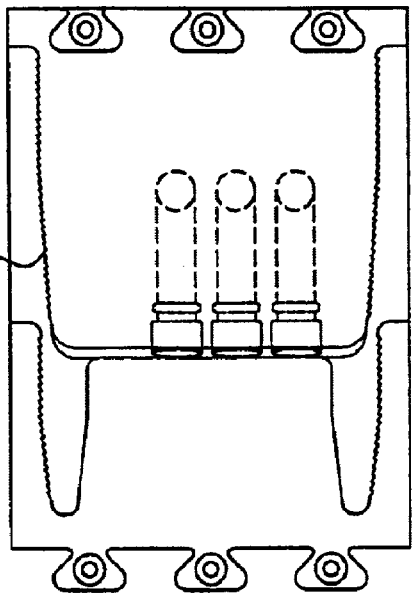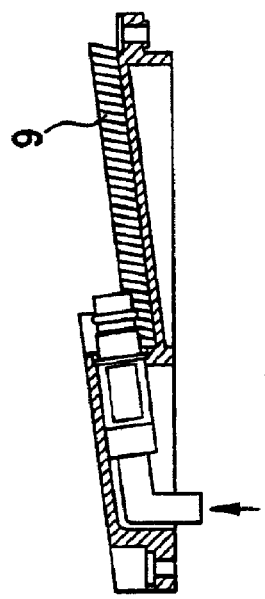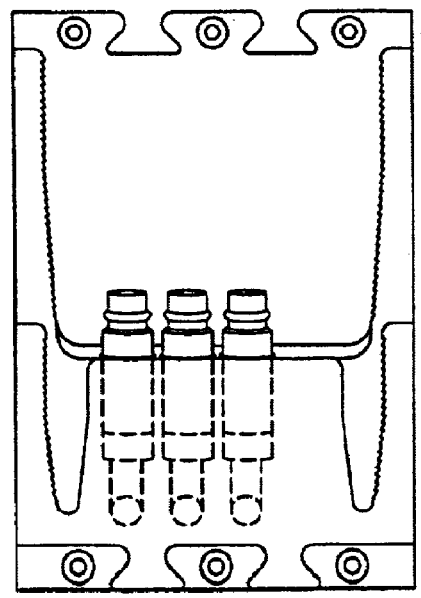
Fig.6a
Fig.6b

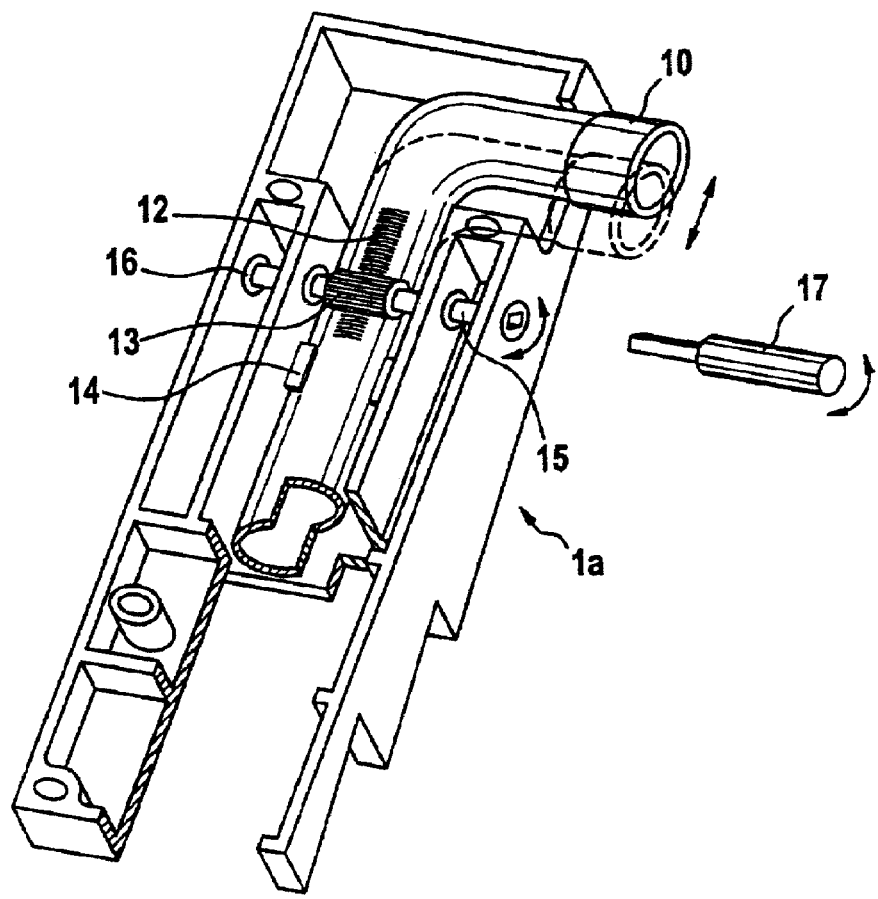

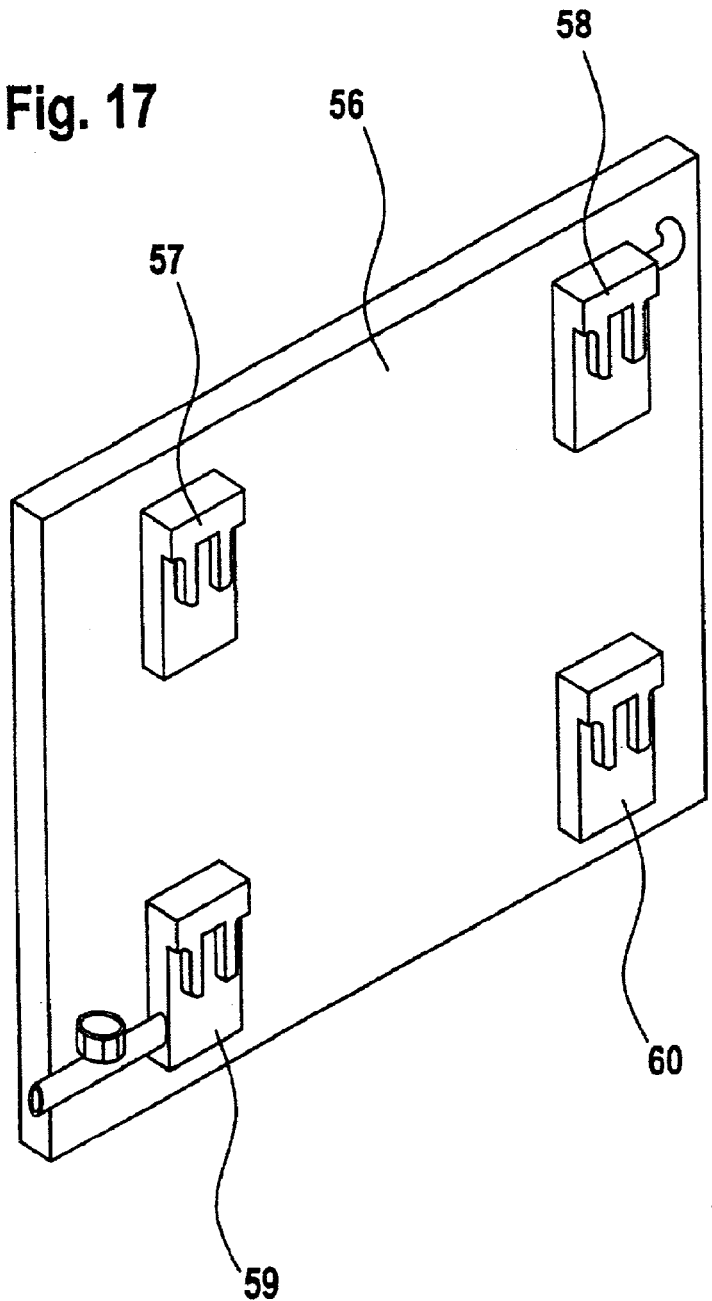

CONNECTING ELEMENT FOR MECHANICALLY CONNECTING COMPONENTS

The invention relates to a connection element for connecting building components effectively, especially building components such as, for example, wall, ceiling and floor elements, as are used in prefabricated building construction. Prefabricated building construction is understood to mean buildings that are intended to stand for a relatively long time as well as buildings that are used only for a relatively short time such as, for example, buildings for emergency accommodation after an earthquake, for military uses, for trade fair constructions etc.

Various connection arrangements are known in prefabricated building construction for connecting wall, ceiling and floor elements. Frequently, for example, wall elements are push-fitted together and then the push-fit connections are bolted together. So-called brackets, which are screwed to the locations being connected, are increasingly being used in prefabricated building construction. Brackets are adequately known from the prior art so that reference is made merely by way of example to the document U.S. Pat. No. 5,284,311.

There is, and there will also be in the future, a need to minimise work on site because work on site generally has to be carried out using local workers who may, depending on circumstances, be poorly trained or expensive. Furthermore, there are scarcely any possibilities for automating installation on site, as a result of which reduction of the costs arising on site can be achieved only with difficulty. A further problem is the construction time, which, in the case of laborious manual installation of wall elements, can be shortened only to a limited degree.

It is accordingly problematic that, in prefabricated building construction, manufacture of the building components can be carried out with a high degree of automation and a high production quality can also be achieved, whereas, during installation of the prefabricated elements on site, the speed of installation and the quality of work can, in contrast, be influenced only to a small extent.

There is, however, a permanent need to reduce construction costs and to improve the quality of assembled structures, the expression "assembled structures" being understood to mean any structure that is put together on site from prefabricated elements, the necessary work substantially being carried out manually by qualified workers.

The invention relates likewise to a device for effectively connecting sub-assemblies in a very great variety of forms to wall, ceiling and floor surfaces of buildings or frameworks. The following list of sub-assemblies is not exhaustive and is intended merely to illustrate the wide range of applications of the invention:

Sub-assemblies from the area of heating, ventilation and air-conditioning:
wall radiators, kitchen unit with gas or electric cooker, oven, air-conditioning unit for wall assembly, utility module having a hot water tank, hot water production unit and various additional devices such as, for example, water filters.

Sub-assemblies from the sanitary area:
modules having wash-basin, WC or shower cubicle.

In similar manner to the production of prefabricated buildings, there is also the problem, in the case of the sub-assemblies mentioned above, of effective and reliable installation on site, especially in cases where the sub-assemblies have a large number of connection points and connections such as, for example, for water, gas, electricity or/and telephone and data-processing devices. Because the complexity of the sub-assemblies is increasing further, highly qualified skilled workers are required for installation on site. As a result, installation costs are increasing. If qualified staff are not used there is an increase in failures, for example as a result of incorrect electrical or signal connections, the correction of which likewise gives rise to high costs.

The problem of the present invention is accordingly to make effective the installation of building components and sub-assemblies in the construction sector so that even less well qualified workers can carry out complicated installation work quickly and without mistakes.

The problem is solved by a device according to claim 1.

A connection element is provided for connecting building components or sub-assemblies mechanically, the connection element having two coupling halves, which can be brought into engagement by a joining movement. The coupling halves can be fastened to the building components or sub-assemblies being connected, using fastening means such as, for example, screws or adhesive. The coupling halves and the fastening means are so dimensioned that, when forces occurring in use are applied, the mechanically stable state of the connected building components or sub-assemblies is maintained for a long period. Inside the coupling halves there are arranged line coupling halves. The line coupling halves are used for connecting liquid lines or gas lines or electrical lines or signal lines such as, for example, for telephone or video devices. The line coupling halves are connected to the ends of the lines. The lines pass through openings to the outside or pass inside the building component or sub-assembly.

In accordance with the invention, the coupling halves in the in-use connected state are in the form of housings of the line coupling halves. The housing comprising the pushed-together coupling halves is so formed that the line coupling halves and the end portions of the lines being connected are protected from damaging operational or environmental influences. Because the operational or environmental influences may be very varied, the person skilled in the art will, on the basis of the technical teaching imparted, have to design the coupling halves so that, with regard to the specific application, they adequately protect the line coupling halves and the end portions of the lines being connected. It may accordingly be necessary, for example under certain operational conditions, to provide a hermetically sealed housing in order to avoid corrosion on the line coupling halves. In that case, the line coupling halves are, in the connected state, enclosed on all sides and can have seals that, in the connected state, prevent the entry of atmospheric humidity or water. The very great variety of forms of such seals are adequately known to the person skilled in the art, for example from the field of the installation of electric cables in wet rooms.

It should be mentioned that the procedure for dimensioning and designing the coupling halves is as follows:

a. dimensioning according to the mechanical operational forces to be expected, taking into account the installation situation and the space required for the line coupling halves;

b. dimensioning according to the damaging operational and environmental influences to be expected, the specific installation conditions also having to be taken into account in this instance. Accordingly, a coupling half can, for example, be open to the rear, despite a requirement for sealing, if the coupling half is arranged within a recess in the building component being connected. Covering and sealing to the rear are, in that instance, accomplished by the building component.

The basic idea of the invention therefore consists in providing mechanical fastening elements that have couplings for energy and signal supply. These mechanical fastening elements are used in same manner as the conventional brackets, that is to say they are fastened using fastening means such as, for example, screws, at the locations intended for that purpose on the building components or sub-assemblies being connected. The mechanical fastening elements are so constructed that the line couplings for the energy and signal lines are, in the connected state, so encased that they are adequately protected against damaging influences.

The main advantage of the invention is that, for the first time, there is provided a connector that can be used in highly universal manner, that—depending on the requirement—can be used in the same manner as a conventional bracket for a very great variety of purposes and that can be installed with little difficulty at freely selectable locations on the building components or sub-assemblies being connected. As is usual in the case of conventional brackets, the connection element according to the invention can be arranged recessed in grooves or in blind drilled holes.

It is accordingly no longer necessary to carry out connection of the individual supply and signal lines separately, after joining the building elements together, as a result of which expensive installation time is saved. Because skilled workers are no longer required for connection of the supply and signal lines, the functional reliability of the connection locations can be substantially increased. The invention is found to be especially advantageous in the case of modern buildings that are controlled by a building management system. Such building management systems require, amongst other things, a large number of sensors, which are connected to electronic control devices, resulting in extensive wiring. When that wiring is already integrated into the walls, ceilings etc. and is connected automatically and without error in the course of installation of the walls, ceilings etc., costs can be reduced and quality increased.

It will be clear to the person skilled in the art that the general inventive idea can be put into practice in a great variety of arrangements. The description of embodiments of the subordinate claims and of exemplary embodiments indicates basic arrangements so that the invention is adequately disclosed to the person skilled in the art.

According to claim 2, the connection element is so arranged that the direction of the joining movement of the coupling halves is the same as the direction of the joining movement of the line coupling halves, that is to say when pushing together the mechanical coupling halves the line coupling halves are also pushed together in the same direction. This embodiment has a simple arrangement.

According to claim 3, the connection element is so arranged that the direction of the joining movement of the coupling halves differs from the direction of the joining movement of the line coupling halves, that is to say the directions of the joining movements are not the same. This embodiment is advantageous when structural dimensions of the components being connected allow for only restricted space conditions, that not being feasible using an embodiment according to claim 2.

According to claim 4, the connection element is so arranged that the line coupling halves are joined together at the same time as the coupling halves, that is to say when the mechanical coupling shells are completely joined together the line coupling halves are also joined together. This embodiment makes possible a simple and economical arrangement.

According to claim 5, the connection element is so arranged that, during connection, first the coupling halves are completely connected and only thereafter are the line coupling halves joined together. This embodiment has particular advantages under especially tough installation conditions. For example, the line coupling halves can remain in a protected position until the coupling halves have been completely closed. Connection of the line coupling halves is performed only within a completely protected housing.

According to claim 6, the connection element is so arranged that the line coupling halves can be connected singly or together by means of a connection mechanism. The connection mechanism has the following features: a slide mechanism for bringing together the line coupling halves. The person skilled in the art will understand a slide mechanism in this context to be a guideway on which or in which the coupling halves can slide on a track. Such guideways or slide arrangements can be found in relevant textbooks of design theory and are therefore not further described. In order to drive the slide mechanism, a drive mechanism is provided, the subject-matter of claims 7 and 8 comprising two possible embodiments of a drive mechanism.

According to claim 7, the drive mechanism has a spring mechanism, wherein a blocked, biased spring drives the slide mechanism when blocking of the spring is released automatically or manually. Automatic release of the blocking can be carried out, for example, as a result of displacement of a pin blocking the spring, which is brought about when the mechanical coupling halves are joined together and, as a result, blocking of the spring is removed. Such arrangements may either be found complete in relevant textbooks or are part of the technical knowledge that is always at the disposal of a design engineer, who is therefore not required to act inventively.

According to claim 8, the drive mechanism is arranged to be actuated manually. For example, the drive mechanism can be actuated using a key, that is to say when the coupling halves are completely connected, a key-like tool is pushed into a recess—in similar manner to a key-hole. The slide mechanism is actuated by rotating the tool. The line coupling halves can accordingly be joined together, as well as separated again. Here too, the person skilled in the art will be familiar with a very great variety of arrangements for solving this problem such as, for example, arrangements from the field of locks or simple arrangements having a rack and pinion, wherein the pinion is turned using the tool, resulting in movement of the rack, which is coupled to the slide mechanism. The person skilled in the art will likewise also be familiar with hydraulic or pneumatic solutions, wherein a piston coupled to the slide mechanism is displaced as a result of the introduction of liquid or air into a cylinder.

According to claim 9, the connection element is so arranged that the coupling halves have grooves located on the inside and projections matched thereto, which engage with one another when the connection element is in the connected state and serve to maintain or improve the mechanical connection properties. Arranged inside the grooves and projections engaging with one another are electric contacts. Using this embodiment, the space required for the electric line coupling halves can be reduced because the electric contacts are integrally connected to the coupling half in question.

According to claim 10, the connection element is so arranged that inside the coupling halves there are provided flat portions that are in a close positional relationship to one another when the coupling halves are in the connected state. Provided on those flat portions are contact elements for producing a signal connection. When the coupling halves are in the connected state, the contact elements located opposite one another touch and the contact is closed. Because the currents flowing for the signal connection are only low, the contact elements can be of small dimensions. As a result of this embodiment, the space required for the signal-related line coupling halves can be reduced.

According to claim 11, there is provided a connection element whose coupling halves have a rectangular plinth portion, in which fastening holes are provided. Arranged on the plinth portion are wedge-shaped or conical engaging elements and wedge-shaped or cone-shaped recesses matched thereto. The plinth portion can be fastened by simple means on a surface, in a recess or in a groove. The form of the engaging elements can be freely selected by the person skilled in the art and matched to the relevant requirements without requiring an inventive step.

According to claim 12, there is provided a connection element wherein at least one engaging element pair is in the form of a pipe coupling that can be pushed together and that forms the connection for a liquid line. This embodiment is especially economical because the double function of the engaging element pair saves having a separate pipe coupling.

According to claim 13, in the case of the media supply connection elements in pipe form, there is provided a pressure-actuatable internal lock and internal seal which bring about locking and sealing of the connection when it is subjected to pressure by means of liquid or gas. The advantage of this embodiment is that, after all media connection locations have been completely installed, they can be sealed in a single operation by the propagation of pressure.

According to claim 14, the connections are produced as follows: A pressure-activatable adhesive is applied in the factory to the joining press surfaces at the connection locations. Such adhesives are known to the person skilled in the art. They comprise, for example, small spherules in which adhesive is embedded. When carrying out joining under pressure, for example when pressing surfaces together, the spherules burst and release the adhesive so that the joining press surfaces are bonded to one another. A very stable connection is produced as a result of this measure.

According to claim 15, there is provided on the joining press surfaces, which are in pressing contact on being joined together, an asymmetrical surface toothed arrangement, which forms a unilaterally acting frictional and positive connection after pressing together.

It is left to the person skilled in the art to select suitable locations for arranging the adhesive connection or the surface toothed arrangement because it is only necessary, for that purpose, to have knowledge of the strength or static characteristics of the specific building construction.

According to claim 16, the contacts of the electrical connection elements are encapsulated. The capsules are in the form of a plug and coupling. Arranged over each of the areas that are pushed together is a thin film that hermetically seals the electric contacts and, as a result, prevents the entry of moisture and, consequently, corrosion. The films are broken when the plug and coupling are joined together. However, that occurs only once a hermetic seal has again been produced by the connection of plug and coupling. A specific arrangement is described in an exemplary embodiment.

According to claim 17, there is introduced into the plug and the coupling a moisture-binding substance which lastingly absorbs environmental moisture that may still enter when the plug and coupling are joined together.

The invention will be described below in greater detail with reference to exemplary embodiments and selected application examples in conjunction with the accompanying diagrammatic drawings.

FIGS. 1a–d show, in diagrammatic form, a first embodiment of the invention.

FIGS. 2a–d show, in diagrammatic form, a second embodiment of the invention.

FIGS. 3a–d show, in diagrammatic form, a third embodiment of the invention, having a pressure-actuated lock.

FIGS. 4a–c show, in diagrammatic form, a fourth embodiment of the invention, having a pressure-activatable adhesive connection.

FIGS. 5a, b show, in diagrammatic form, a fifth embodiment of the invention, having a protective film.

FIGS. 6a–d show, in diagrammatic form, a sixth embodiment of the invention, having a frictional/positive locking connection.

FIGS. 7a, b show, in diagrammatic form, a seventh embodiment of the invention.

FIG. 8 shows, in diagrammatic form, an eighth embodiment of the invention.

Figure 11A:
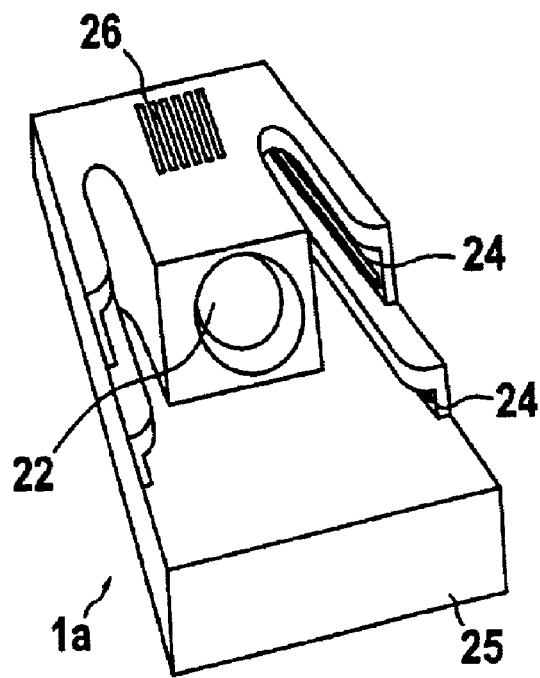

FIGS. 11a, b show, in diagrammatic form, an eleventh embodiment of the invention.

Figure 12:
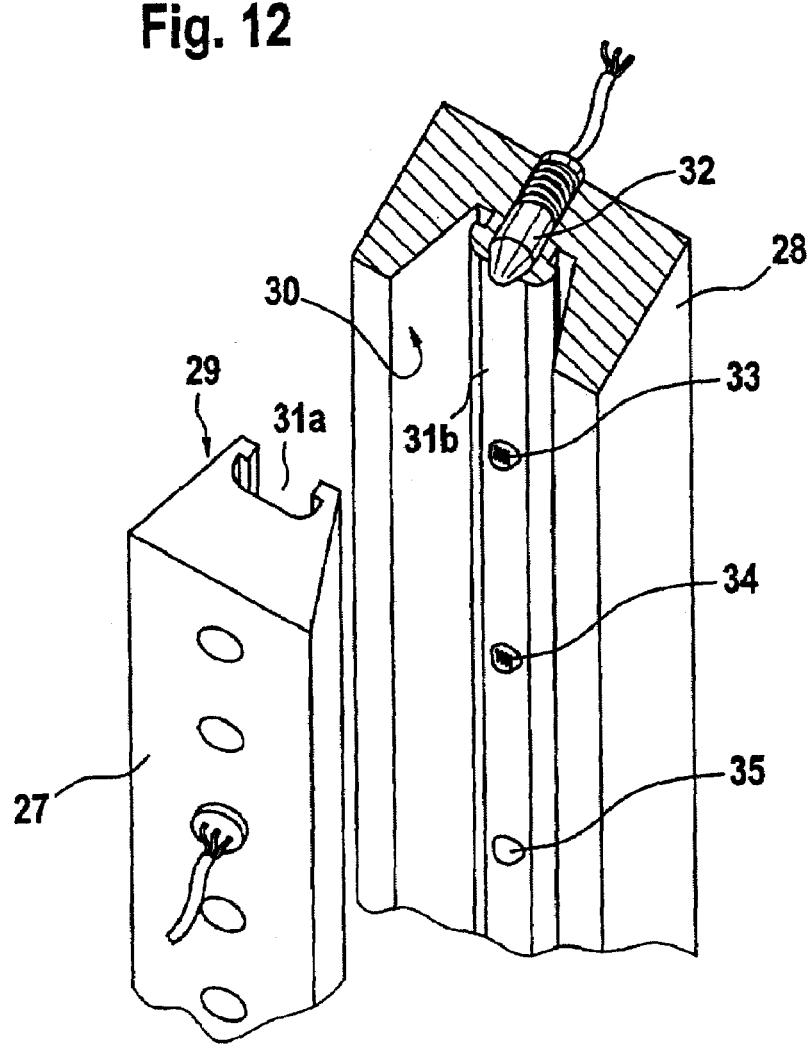

FIG. 12 shows, in diagrammatic form, a twelfth embodiment of the invention.

FIGS. 13–17 show application examples of the invention.

FIG. 1 shows, in diagrammatic form, a first embodiment of the invention, wherein reference symbols 1a and 1b denote wall portions in which there is arranged the line connection, which consists of a large number of plugs 2a and a large number of couplings 2b matched thereto. The plugs 2a are held in an assembly holder 3a and the couplings 2b are held in an assembly holder 3b. The assembly holders are fastened in corresponding recesses in the wall portions. The recesses are so constructed that the wall portions can be pushed into one another and form a closed wall portion in the pushed-together state. FIG. 1a shows, in a side view, two wall portions 1a and 1b having recesses, in which assembly holders 3a and 3b are fastened by means of screw connections. It will be clear to the person skilled in the art that the fastening of the assembly holders 3a and 3b can be accomplished in various ways so that further explanations in this regard can be dispensed with. FIG. 1b shows the invention in a top view, wherein three line plugs 2a and three line couplings 2b can be seen. In the present case, sealing between the line plug 2a and the line coupling 2b is carried out by means of an O ring 4. When the two wall portions 1a and 1b are, as shown in FIG. 1c, brought together in the direction of the arrow, the line plugs 2a and the line couplings 2b come into engagement. In order to compensate for manufacturing tolerances, the line plugs 2a and/or the line couplings 2b are mounted in floating (i.e. laterally displaceable) manner. This measure guarantees a constraint-free and reliable connection. FIG. 1d shows the end state, wherein the three lines are connected to one another reliably and sealed. Additional constructional measures ensure that the two wall portions 1a and 1b are held in the position according to FIG. 1d.

FIG. 2 shows, in diagrammatic form, a second embodiment of the invention, wherein assembly holders 3a and 3b have a centring device 5a, 5b, which guarantees reliable joining. The centring device is so dimensioned that the transverse forces that occur when the walls are joined together are reliably taken up, so that the coupling halves are not damaged by being brought together in misaligned manner. FIG. 2 is analogous to FIG. 1, so that the person skilled in the art will not need it to be described again.

Figure 3C:
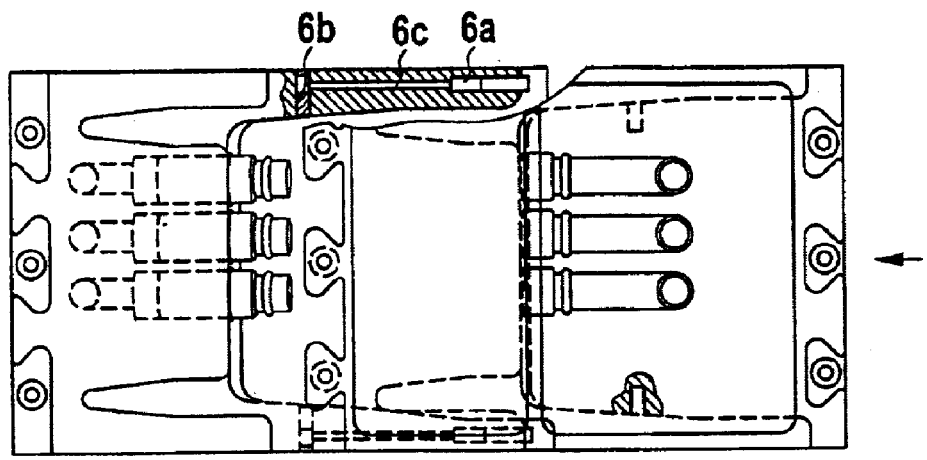
Figure 3D:
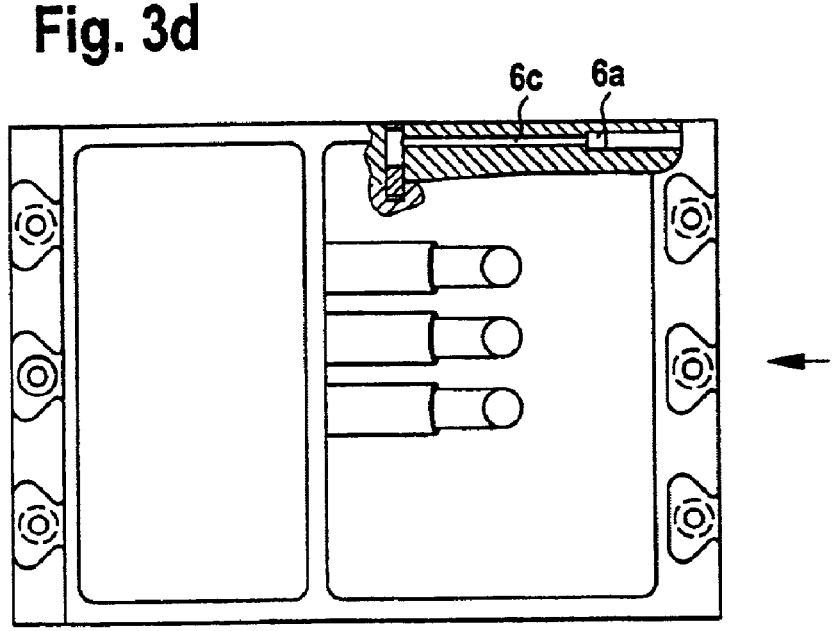

FIG. 3 shows, in diagrammatic form, a third embodiment of the invention, wherein there is provided a locking device 6 which reliably prevents the building components such as, for example, walls from coming apart again and, consequently, the coupling halves from becoming loose or, as a result, from being damaged in such a way that sealing is no longer ensured. In the present example, the locking device 6 has a pressure piston and cylinder arrangement 6a and also a locking piston and cylinder arrangement 6b, which are connected to one another by means of a hydraulic line 6c. When the building components and the coupling halves are reliably connected, there is exerted on the pressure piston of the pressure piston and cylinder arrangement 6a a force that displaces the piston, as a result of which the locking piston of the locking piston and cylinder arrangement 6b is pressed, by means of the hydraulic line 6c, into a recess 6d, as a result of which the building components are firmly and reliably connected to one another. The application of force to the pressure piston can be accomplished, for example, by utilising the force exerted on joining the building components together. In FIG. 3d it can be seen that the locking piston has engaged in the recess 6d.

A means of producing a lasting and stable connection is shown in FIG. 4. All contacting surfaces of the centring device are coated with a special adhesive 7. When the contacting surfaces are pressed together under strong pressure, the adhesive 7 is activated and it fixedly connects the contacting surfaces to one another. Such pressure-activatable adhesives are known to the person skilled in the art so that a more detailed explanation thereof is not necessary.

In order to prevent the coupling halves from corroding, which is especially disadvantageous, for example, in the case of electrical connections, the coupling halves are covered with a protective film 8 according to FIG. 5. On joining, the protective film 8 is broken in controlled manner so that the hitherto hermetically sealed, that is to say non-corroded, elements of the coupling halves are joined together. In a further embodiment, sealing elements are provided which re-establish a hermetic seal after joining.

Figure 6C:
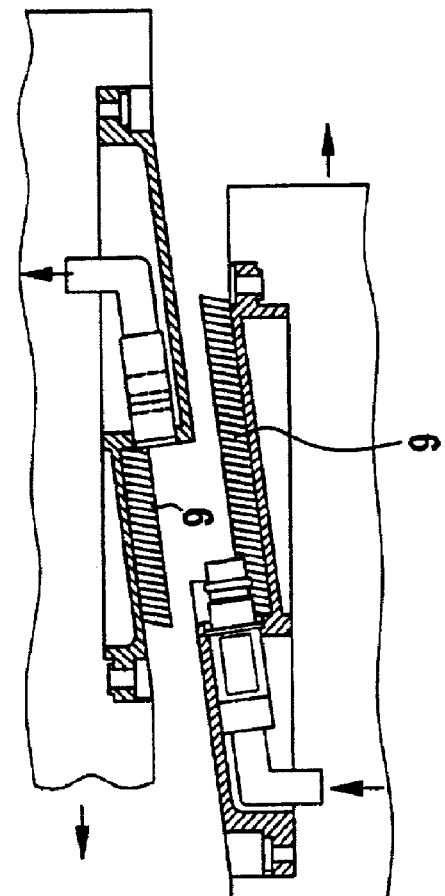
Figure 6D:
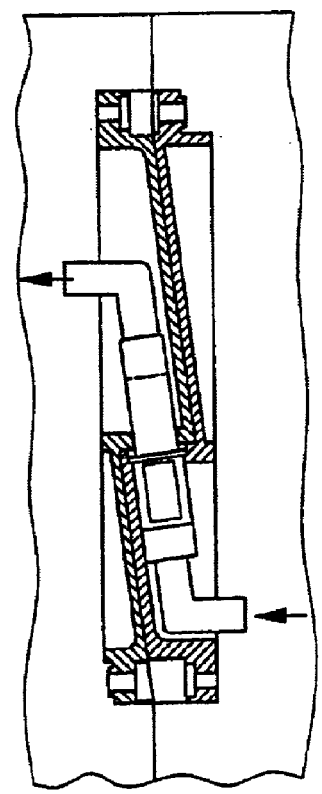

FIG. 6 shows a simple and very effective measure for reliable and lasting connection. The contacting surfaces of the centring device are provided with a multi-wedge-shaped surface toothed arrangement 9. When the contacting surfaces are pressed against one another in the course of joining, the teeth of the surface toothed arrangement 9 lock in and remain in that position so that a positive and frictional connection is produced. The person skilled in the art will know that, for this purpose, the multi-toothed arrangement must be asymmetrical so that the hooking-in effect occurs in only one direction, that is to say, in the present example, on pressing together the contacting surfaces.

FIGS. 1 to 6 show the various embodiments of the invention with reference to a substantially similar basic form of coupling. The various installation phases are illustrated so that it is possible, for the person skilled in the art, to dispense with repetitions in the description. The following examples show that it is also possible to use basic forms of coupling that are different in principle.

Figure 7A:
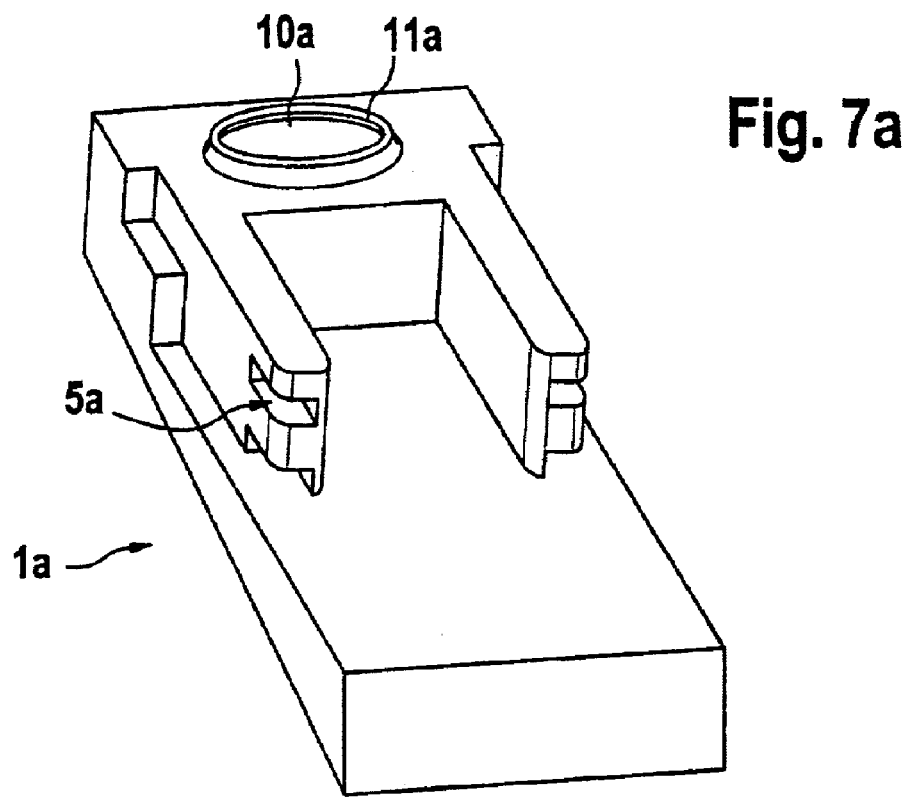
Figure 7A:
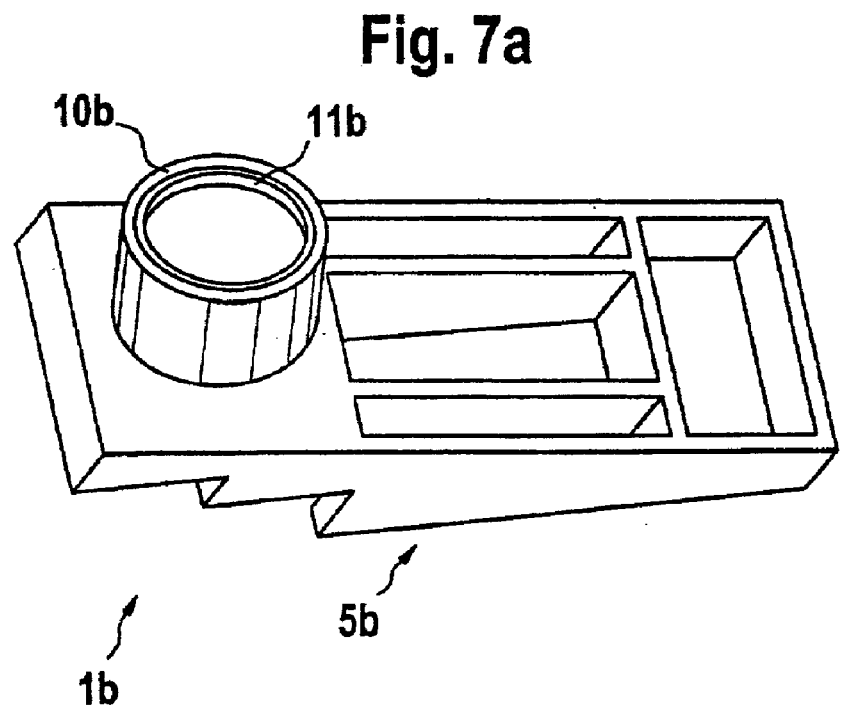

FIG. 7 shows an embodiment of the coupling having two coupling halves 1a, 1b, with only a water pipe 10 being connected in this embodiment. When the coupling halves are pushed together, the two pipe portions 10a, 10b are located one above the other. A seal arrangement 11a, 11b is provided for the purpose of sealing.

FIG. 8 shows a coupling half 1a wherein an angled water pipe 10 is movably arranged. The water pipe has, on its surface, a toothed arrangement 12, which is in engagement with a pinion 13. The water pipe 10 is pressed against the pinion 13 by a counter-mounting 14. The pinion 13 is connected to a pin 15 which is rotatably mounted in a mounting 16. By means of a tool 17, the water pipe can accordingly be displaced in its longitudinal extent. When the coupling half 1a is placed on a coupling half matched thereto, the coupling halves of the water pipes to be connected are not yet in engagement. Only as a result of turning the tool 17 and the resulting displacement of the first water pipe towards the water pipe of the other coupling half is the connection accomplished. This exemplary embodiment is accordingly a practical form of the invention according to claim 5 and the claims dependent thereon.

Figure 9:
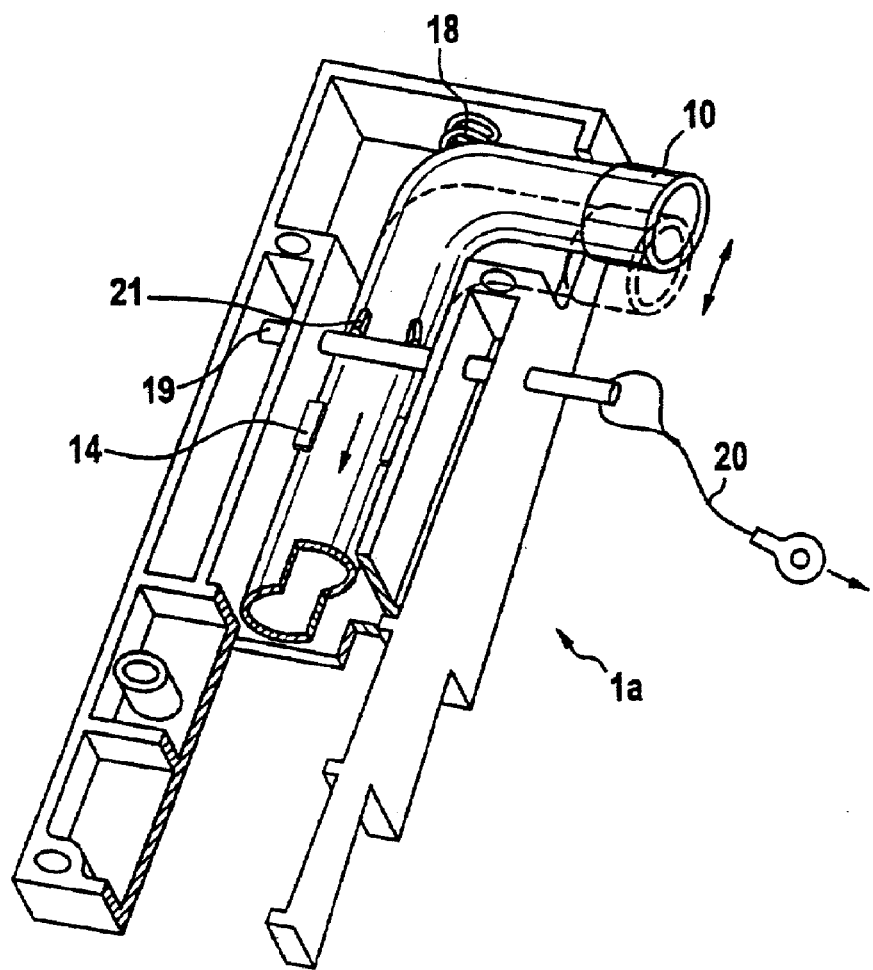
FIG. 9 shows, in diagrammatic form, a ninth embodiment of the invention.

FIG. 9 shows a similar coupling half 1a to FIG. 8. The water pipe 10 is likewise displaceably mounted and is urged in the direction of the arrow by means of a spring 18. When the coupling half 1a is placed on a coupling half matched thereto, the coupling halves of the water pipes to be connected are not yet in engagement because a blocking pin 19 prevents movement of the pipe. Only by pulling out the blocking pin 19, using a pull rope 20, is a stop 21 released, as a result of which the pipe moves in the direction of the arrow and is coupled to its counterpart component. The sealing arrangements required for the purpose preferably have O rings.

Figure 10:
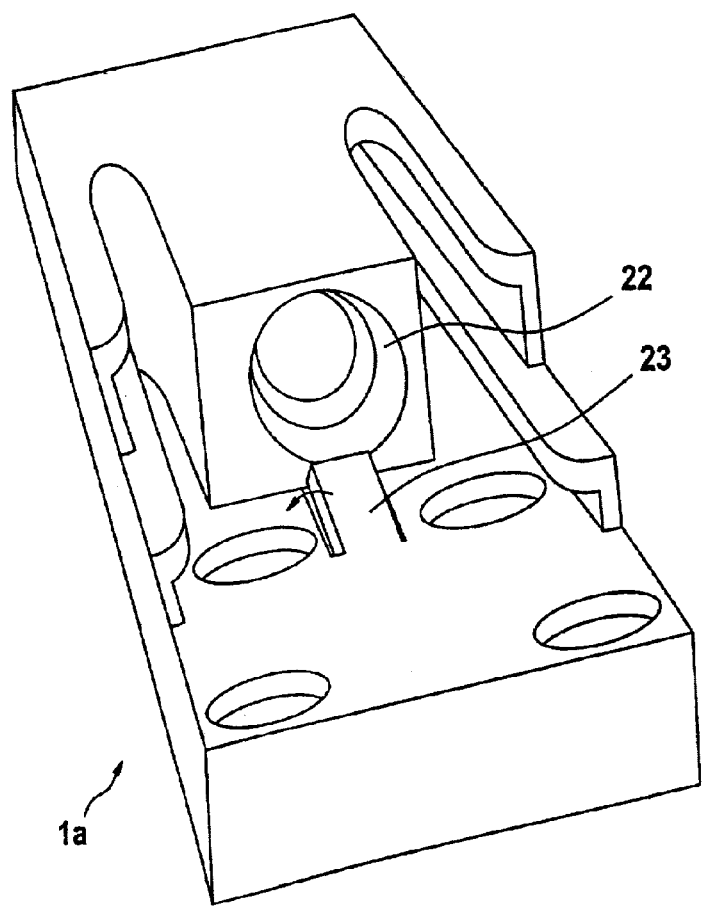
FIG. 10 shows, in diagrammatic form, a tenth embodiment of the invention.

FIG. 10 shows a coupling half 1a having an integrally formed water pipe coupling 22. The integral formation saves having a separate coupling element for the water line. As can be seen from the illustration, the water pipe coupling forms a sturdy central element which is also capable of taking up large mechanical forces. Reference symbol 23 denotes a spring-loaded blocking flap, shown in diagrammatic form, which on coupling together is pressed in the direction of the arrow by the counterpart component and in the final state snaps into a recess in the counterpart component. As a result, the coupling is effectively prevented from coming apart.

Figure 11B:
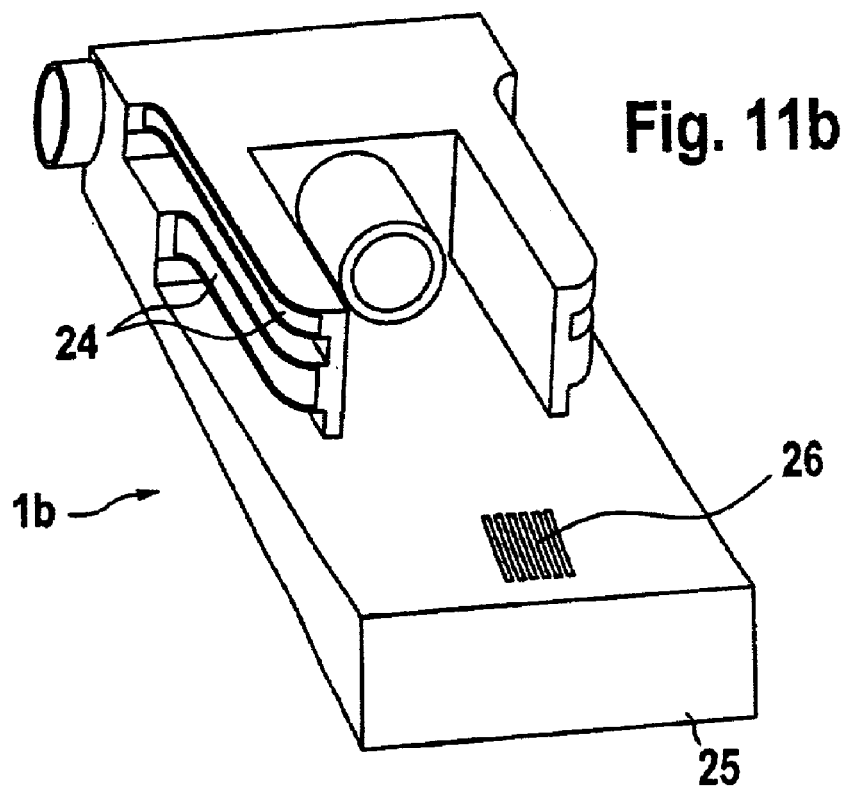

FIG. 11a likewise shows a first coupling half 1a having an integrally formed water pipe coupling 22. In addition, electrical contacts 24 are provided inside the engagement grooves for the transmission of electrical energy. Furthermore, there are arranged on the rectangular plinth element 25 a row of small contact elements 26, which may be used, for example, for the transmission of sensor signals such as, for example, temperature. FIG. 11b shows the second coupling half matched thereto.

FIG. 12 shows a further embodiment of the invention. The coupling halves are in the form of wedge-shaped profiled rods 27, 28, the first coupling half having a male wedge 29 and the second coupling half having a female wedge 30. There is furthermore provided a positively acting connection device 31a, b, the mode of operation of which can be seen in FIG. 12. When both profiled rods are brought into engagement, the connection device 31a engages around the connection device 31b. The dimensioning of this connection device 31 is not described in further detail because such click-in connection arrangements are adequately known and can be arranged as required. Provided inside the connection device are line coupling elements 32 to 35, which are connected to one another when the profiled rods 27, 28 are coupled together.

Figure 13:
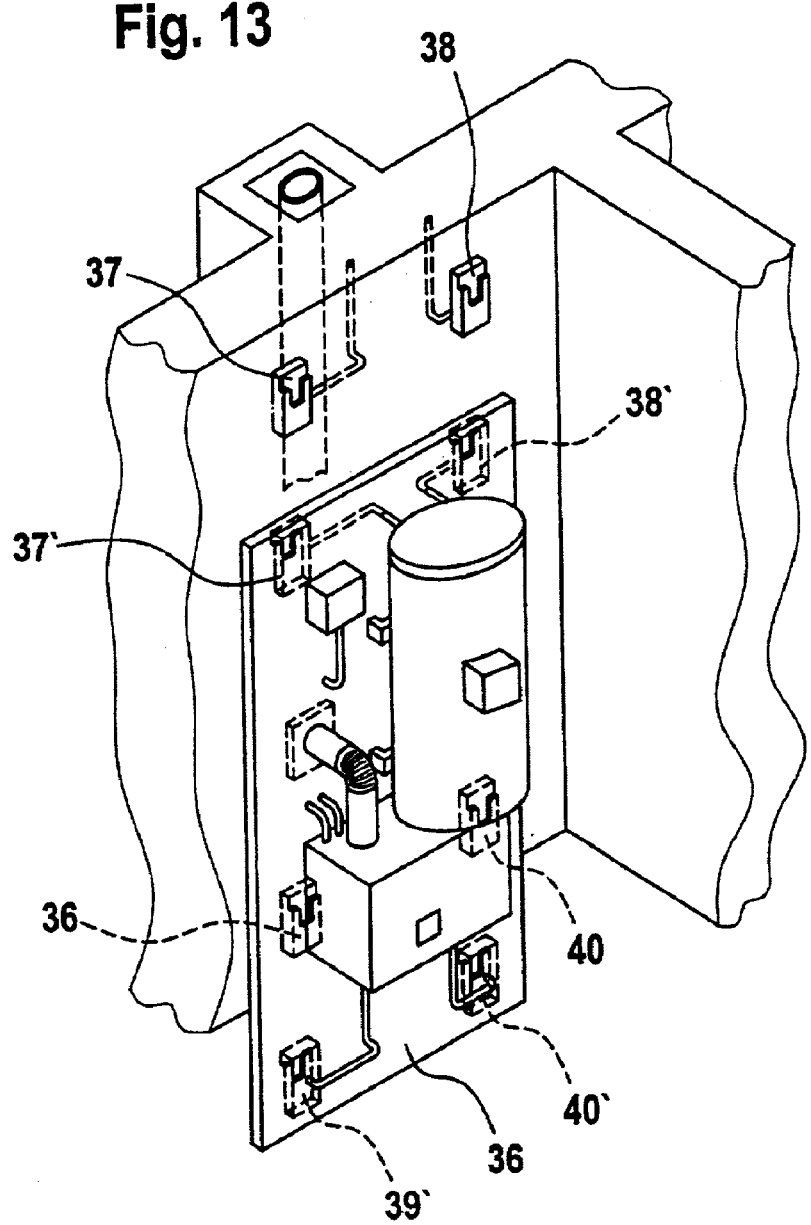

FIG. 13 shows a possible application of the invention in the field of heating and water installation. Various units are arranged on a baseplate 36. Arranged in the wall are four couplings 37, 38 (39, 40 not shown) according to the invention, which are connected to various lines running within the wall. Arranged on the baseplate 36 are the counterparts matched to the couplings 37 to 40. As a result, the baseplate 36 can be completely or possibly even automatically kitted out at the manufacturer's. The kitted-out baseplate is simply hung into place on site. It will be clear that the installation costs on site can be considerably reduced as a result. Furthermore, kitting-out is carried out in a very short time and the risk of mis-connection or incorrect wiring is ruled out.

Figure 14:
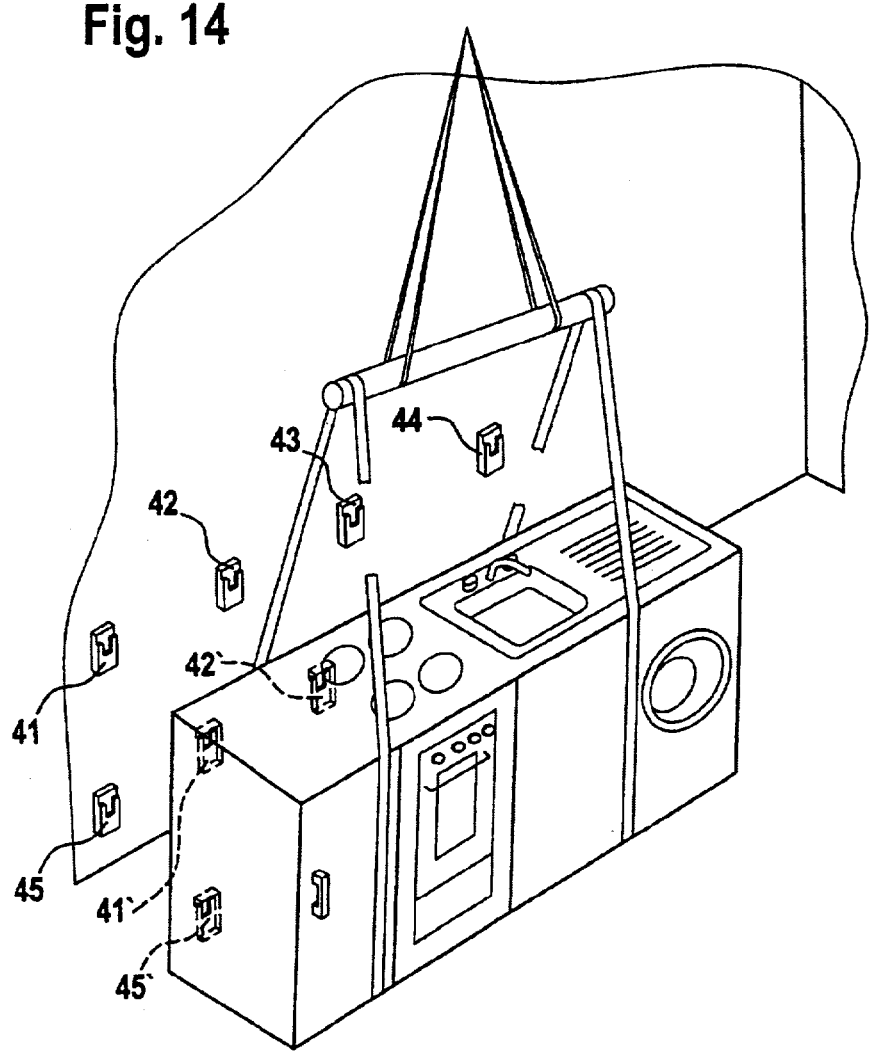

FIG. 14 shows a further possible application of the invention in the kitchen sector. It can be seen from the drawing, without more detailed explanation, that a complete kitchen unit consisting of a refrigerator, electric cooker and sink unit together with dishwasher can be hung onto a wall analogously to the description of FIG. 13, reference symbols 41 to 45 denoting the visible couplings.

Figure 15:
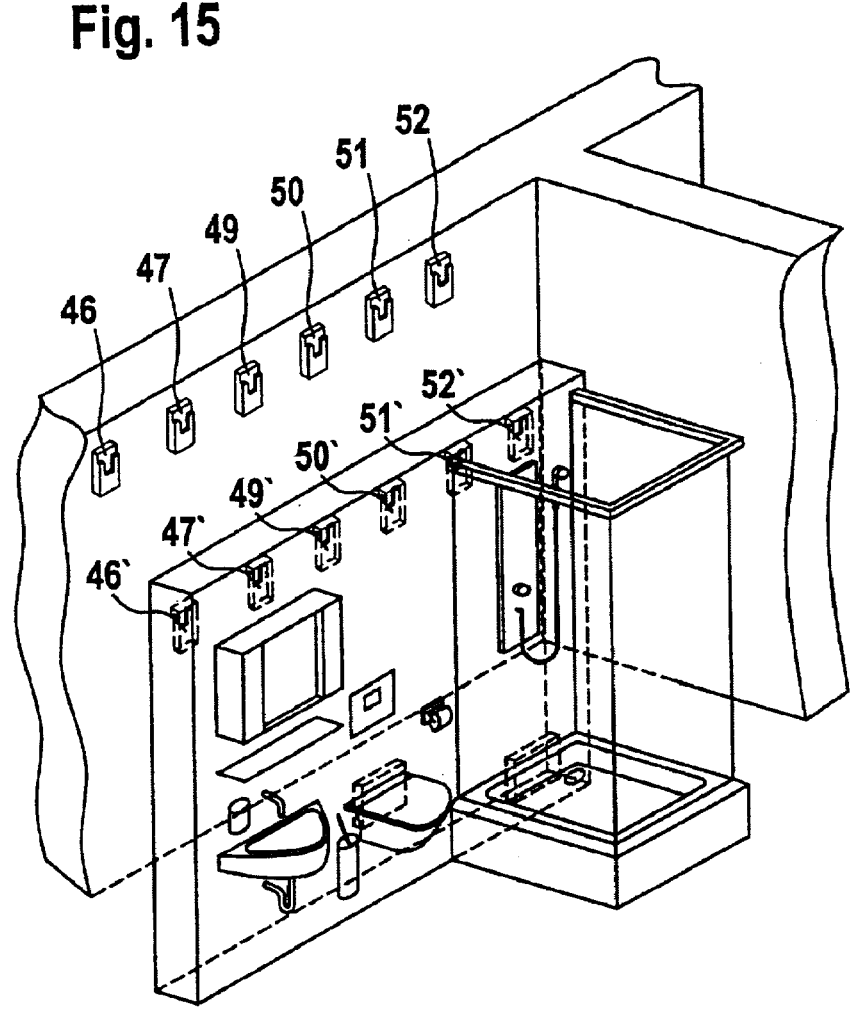

FIG. 15 shows a further possible application of the invention in the bathroom sector. It can be seen from the drawing, without more detailed explanation, that a complete sanitary unit block consisting of a shower cubicle, toilet, wash-basin together with a mirrored cabinet can be fastened to a wall with little outlay analogously to the description of FIG. 13, reference symbols 46 to 52 denoting the couplings.

Figure 16:
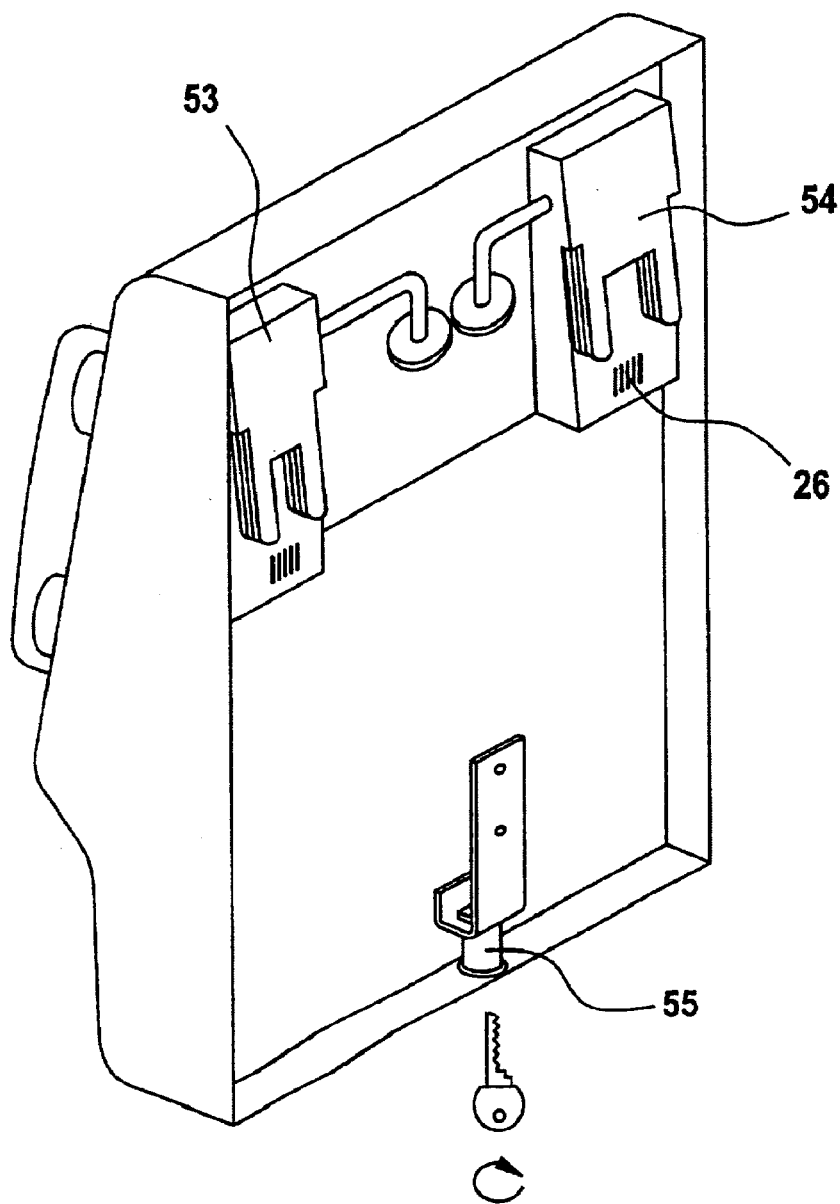

FIG. 16 shows a further possible application of the invention in the installation of public telephone devices. Arranged on the rear of the telephone device are two couplings 53, 54 according to the invention and a locking device 55 that can be secured. The telephone device can accordingly be rapidly exchanged in the event of a defect and is secured against theft by means of the locking device.

FIG. 17 shows a further possible application of the invention in the heating sector. Provided on a baseplate 56 fastened to a wall are couplings 57 to 60, couplings 58 and 59 being constructed in accordance with the invention. It will be clear that, using this arrangement, panel radiators can be installed very quickly or exchanged in the event of a defect.

Finally, it should be emphasised that the technical teaching of the invention, as disclosed by the features disclosed in the description and the exemplary embodiments, is very wide-ranging. With knowledge of this technical teaching, the person skilled in the art will be able at any time to develop the invention or adapt it to particular requirements without, for the purpose, having to act inventively.

The invention claimed is:

1. Connection element for connecting building components or sub-assemblies mechanically, the connection element, comprising: two coupling halves (1a, 1b) which can be brought into engagement by a joining movement; fastening means, wherein said coupling halves are arranged to be fastened to the building components or sub-assemblies being connected, using said fastening means, the coupling halves (1a, 1b) and the fastening means being so dimensioned that, when forces occurring in use are applied, a predetermined mechanically stable state of the connected building components or sub-assemblies is maintained, wherein line coupling halves (2a, 2b, 10, 22, 32, 33, 34, 35) for connecting liquid lines or gas lines or electrical lines or signal lines are arranged inside the coupling halves (1a, 2b), wherein the line coupling halves in the in-use state are connected to the end portions of the lines being connected, and wherein the coupling halves have openings through which the lines pass to the outside; and wherein the coupling halves in the in-use connected state are in the form of housings for the line coupling halves (2a, 2b, 10, 22, 32, 33, 34, 35), wherein the housing is formed, such that the line coupling halves and the end portions of the lines being connected are protected from damaging operational or environmental influences, wherein the connection element is so arranged such that, first the coupling halves are completely connected and thereafter the line coupling halves are joined together, wherein the connection element is so arranged that the line coupling halves can be connected singly or together by means of a connection mechanism, the connection mechanism having the following features:
a slide mechanism (14) for bringing together the line coupling halves, and
a drive mechanism (13,14,15,16) to drive the slide mechanism.

2. Connection element according to claim 1, the drive mechanism has a spring mechanism, wherein a blocked, biased spring (18) actuates the slide mechanism after blocking (19) of the spring (18) has been released automatically or manually.

3. Connection element according to claim 1, wherein the drive mechanism (17) is arranged to be actuated manually.

4. Connection element for connecting building component or sub-assemblies mechanically, the connection element, comprising: two coupling halves (1a, 1b) which can be brought into engagement by a joining movement; fastening means, wherein said coupling halves are arranged to be fastened to the building components or sub-assemblies being connected, using said fastening means, the coupling halves (1a, 1b) and the fastening means being so dimensioned that, when forces occurring in use are applied, a predetermined mechanically stable state of the connected building components or sub-assemblies is maintained, wherein line coupling halves (2a, 2b, 10, 22, 32, 33, 34, 35) for connecting liquid lines or gas lines or electrical lines or signal lines are arranged inside the coupling halves (1a, 2b), wherein the line coupling halves in the in-use state are connected to the end portions of the lines being connected, and wherein the coupling halves have openings through which the lines pass to the outside; and wherein the coupling halves in the in-use connected state are in the form of housings for the line coupling halves (2a, 2b, 10, 22, 32, 33, 34, 35), wherein the housing is formed, such that the line coupling halves and the end portions of the lines being connected are protected from damaging operational or environmental influences, wherein the connection element is so arranged such that, first the coupling halves are completely connected and thereafter the line coupling halves are joined together, wherein the connection element is so arranged that the line coupling halves are joined together at the same time as the coupling halves, wherein the coupling halves have grooves arranged on the inside and projections matched thereto, which engage with one another when the connection element is in the connected state, predetermined portions of the grooves and projections being in a close positional relationship to one another and contact elements (24) being provided at the predetermined portions to produce an electrical connection.

* * * * *